United States Patent
Subramanian et al.

(10) Patent No.: US 7,609,280 B2
(45) Date of Patent: Oct. 27, 2009

(54) HIGH LEVEL GRAPHICS STREAM

(75) Inventors: Sriram Subramanian, Kirkland, WA (US); Leonardo E. Blanco, Redmond, WA (US); Andrei Baioura, Bellevue, WA (US); Oreste Dorin Ungureanu, Duvall, WA (US); Sriya Sampath, Redmond, WA (US); Pawel Olszta, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/279,194

(22) Filed: Apr. 10, 2006

(65) Prior Publication Data

US 2007/0052723 A1    Mar. 8, 2007

Related U.S. Application Data

(60) Provisional application No. 60/714,880, filed on Sep. 7, 2005.

(51) Int. Cl.
   G06T 1/00 (2006.01)
   G09G 5/00 (2006.01)
(52) U.S. Cl. .................. 345/619; 345/522; 345/630
(58) Field of Classification Search .............. 345/619, 345/553, 629, 630, 522
See application file for complete search history.

(56) References Cited

U.S. PATENT DOCUMENTS

| | | | |
|---|---|---|---|
| 5,657,390 A | 8/1997 | Elgamal et al. | |
| 5,842,040 A | 11/1998 | Hughes et al. | |
| 5,862,383 A | 1/1999 | Laitinen | |
| 6,038,232 A | 3/2000 | Jung et al. | |
| 6,081,265 A | 6/2000 | Nakayama et al. | |
| 6,411,301 B1 | 6/2002 | Parikh et al. | |
| 6,421,058 B2 | 7/2002 | Parikh et al. | |
| 6,424,348 B2 | 7/2002 | Parikh et al. | |
| 6,434,578 B1 | 8/2002 | McCauley et al. | |
| 6,452,600 B1 | 9/2002 | Parikh et al. | |
| 6,466,218 B2 | 10/2002 | Parikh et al. | |
| 6,538,656 B1 | 3/2003 | Cheung et al. | |
| 6,697,074 B2 | 2/2004 | Parikh et al. | |
| 6,798,418 B1 | 9/2004 | Sartori et al. | |
| 6,867,781 B1 | 3/2005 | Van Hook et al. | |
| 6,957,769 B2 | 10/2005 | Hepworth et al. | |
| 7,002,591 B1 | 2/2006 | Leather et al. | |
| 7,075,538 B2 | 7/2006 | Peacock | |
| 7,191,233 B2 | 3/2007 | Miller | |
| 7,196,710 B1 | 3/2007 | Fouladi et al. | |
| 7,200,809 B1 | 4/2007 | Paul et al. | |
| 7,216,288 B2 * | 5/2007 | Westerink et al. | ........ 715/500.1 |
| 7,274,368 B1 | 9/2007 | Keslin | |
| 7,434,166 B2 | 10/2008 | Acharya et al. | |
| 2002/0058499 A1 | 5/2002 | Ortiz | |

(Continued)

OTHER PUBLICATIONS

Nye, "X Protocol Reference Manual", O'Reilly & Associates, Inc., 1989, 1990, 1992, 1995, pp. 38.

*Primary Examiner*—Hau H Nguyen
(74) *Attorney, Agent, or Firm*—Lee & Hayes, PLLC

(57) ABSTRACT

A system that provides graphics commands that represent graphics or an image, to a consuming process. The graphics commands are represented by a visual tree which includes objects and resources describing the objects. The objects and resources are communicated to a composition engine that creates an analogous composition tree that is analogous to the visual tree. The composition tree is used to render the graphics or image.

10 Claims, 7 Drawing Sheets

U.S. PATENT DOCUMENTS

| | | |
|---|---|---|
| 2002/0103935 A1 | 8/2002 | Fishman et al. |
| 2003/0017846 A1 | 1/2003 | Estevez et al. |
| 2003/0076328 A1* | 4/2003 | Beda et al. .................. 345/503 |
| 2003/0076329 A1* | 4/2003 | Beda et al. .................. 345/557 |
| 2003/0222883 A1* | 12/2003 | Deniau et al. ............... 345/582 |
| 2004/0081202 A1 | 4/2004 | Minami et al. |
| 2004/0177373 A1 | 9/2004 | Kawabe et al. |
| 2005/0132385 A1* | 6/2005 | Bourges-Sevenier ........ 719/328 |
| 2005/0163493 A1 | 7/2005 | Kobayashi et al. |
| 2006/0080382 A1 | 4/2006 | Dutta et al. |

* cited by examiner

HIGH LEVEL GRAPHICS STREAM

The present application claims priority under 35 U.S.C. §119(e) to U.S. Provisional Application No. 60/714,880, filed Sep. 7, 2005, the disclosure of which is incorporated herein.

BACKGROUND

When application programs or processes provide images or graphics to be displayed, the application programs or processes may send graphics commands to operating system components or other processes that use the graphics commands to render the images or graphics. The graphics commands, which are also referred to as higher-level graphics commands or primitives, might specify or define colors, lines, shapes, and other graphics constructs. The operating system components or processes receiving the graphics commands may interpret or convert the graphics commands into lower-level graphics information such as individual pixel values or bitmaps which are used to render graphics on a display device.

An example of graphics commands is GDI which represents "Graphical Device Interface", "Graphics Device Interface", or "Graphics Display Interface". In a GDI implementation, an interface (i.e., GDI interface) may be part of or supports a component or process that receives the graphics commands. In particular, the GDI interface receives parameters from an application, where the parameters are for an image or graphic to be represented. The GDI interface produces the image by sending commands to a process or component which in turn renders the image to a display or output device such as a monitor, printer, etc.

In certain implementations, the application programs or processes sending such graphics commands reside on devices or computers that are separate from devices or computers hosting the operating system components or processes that receive the graphics commands. These implementations may be referred to as trans-machine systems, examples of which include terminal service systems where applications reside on a central server computer and remote client computers receive the graphics commands that are rendered locally (i.e., at the client computers). In other implementations, the application programs and operating system components (processes) receiving the graphics commands reside on the same device or computer and may be referred to as trans-process systems. Other implementations may send graphics commands using the same process; however, such implementations may use different threads in which the graphics commands are passed. These implementations may be referred to as trans-thread systems.

Regardless of the particular implementation or system, whether it be trans-machine, trans-process, or trans-thread, the graphics commands sent by the application programs are typically transitory. In other words, once the graphics commands are sent by the application for processing and received, they are immediately consumed or processed. This is particularly true where GDI is used, where the interface receives parameters, creates graphics commands, and the graphics commands are immediately consumed. Therefore, if a particular graphics or image is lost, the application program or process must resend the graphics commands (or parameters) to the receiving component or process. Furthermore, since graphics commands may be consumed as they are received, if a user desires to replicate the graphics or image particular to the graphics commands, the specific graphics commands must be resent.

In certain situations, graphics commands are optimized or compressed. This optimization or compression typically is performed in trans-machine implementations, such as terminal-service systems, where communication between a central server computer and remote client computers is through a communications medium such as a network. Bandwidth over the communication medium or network is often limited. Therefore, optimization or compression may be needed. Optimization or compression may result in compromised image quality. For example, in certain situations, it is desirable to magnify the graphic or image at the receiving computer or device; however, since the graphics commands have been compressed, magnification may result in image degradation.

Furthermore, in certain cases, different applications may support or provide different types or dissimilar graphics commands. For example, one application may support a legacy graphics command format such as GDI, while another application may support a new or different graphics command format. However, it may be desirable to support different graphics command formats and allow graphics to be processed from applications using different graphics command formats.

SUMMARY

Graphics commands are provided in data packets in a graphics stream. The data packets represent objects and resources of an editable model such a visual tree. The graphics stream or data packets are sent through a dedicated channel, where an application may be introduced in the channel that modifies the graphics stream or data packets. The data packets are received by a composition engine that creates a composition tree that is analogous to the visual tree.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE CONTENTS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
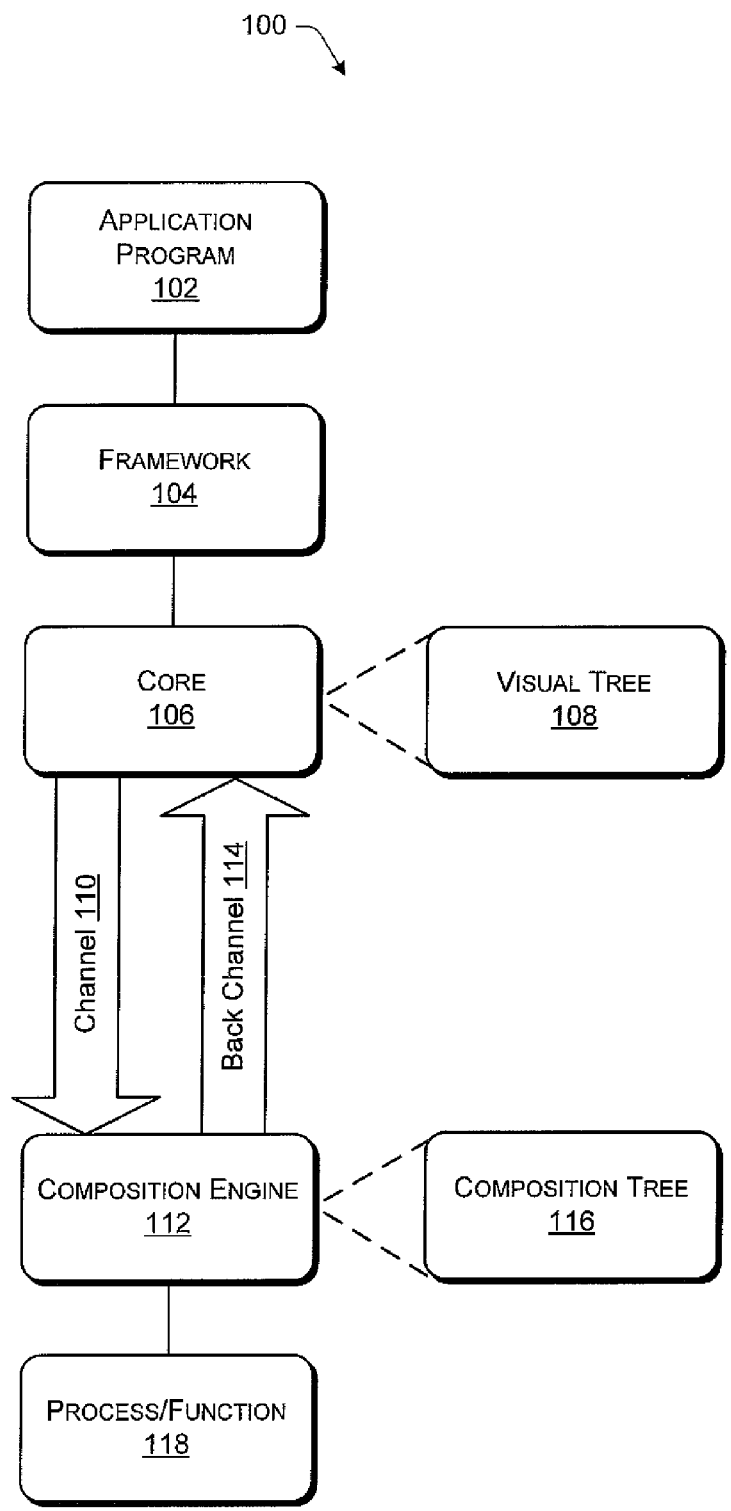
FIG. 1 is a block diagram of a system that implements a channel to provide graphics in the form of a visual tree.

FIG. 1 shows a system 100 that provides and renders graphics or images. In particular, the system 100 implements the use of visual trees and composition trees in providing and rendering graphics or images. System 100 may be implemented as a trans-machine system where elements or processes of system 100 reside in more than one machine or device, and communication between the machines or devices is through a communication medium such as a network that includes intranets and the Internet. Examples of trans-machine systems include terminal-service systems, where a central server computer supports one or more client computers. In particular, application programs are resident at the central server computer and accessed or used by the client computers. The system 100 may also be implemented as a trans-process system, where elements or processes reside on the same machine or device. Another exemplary implementation of system 100 is a trans-thread system, where graphics are sent through different threads within the same process.

For simplicity, system 100 shows a single application program 102; however, system 100 may include multiple application programs. The system 100 further includes a framework 104. An example of framework 104 includes Windows® Presentation Foundation provided by the Microsoft Corporation. Framework 104 accesses one or more application programs, such as application program 102. In particular, graphics commands are provided by application program 102 to framework 104. Framework 104 may implement or include a particular application program interface (API) in communicating with application program 102.

System 100 includes a core 106 which receives graphics commands from framework 104 and creates a visual tree 108. Visual tree 108 is a representation of graphics or an image provided by the framework 104, where the graphics or image is representative of the graphics commands from application program 102.

The visual tree 106 is made up of visual objects and resources as described in further detail below. The visual objects and resources may be translated into particular data packets that make up a data or graphics stream. The graphics stream is communicated over a dedicated channel 110 to a composition engine 112. Channel 110 is a dedicated channel in the sense that when other application programs are included in system 100, each application program has its own dedicated channel. In a trans-thread system, where the graphics stream is communicated over different threads, each dedicated channel is representative of a particular thread. As further discussed below, the channel 110 may also be partitioned into different functional parts, including a top half channel and a bottom half channel.

The data packets of the graphics stream may be provided in a particular format. An exemplary data packet format is a 32-bit data packet size value and a 32-bit unsigned packet identification value followed by packet data of one or more commands. Furthermore, when multiple channels are implemented, each cannel may be associated with a specific connection. A data packet may provide a message that specifies the channel connection. Such a message may be implemented in the following format that includes exemplary fields "Connection ID", followed by "Channel ID", followed by "Command ID", followed by "Command Data".

A back channel 114 may be provided that allows the composition engine 112 to send back messages to the core 106, framework 104, and application program 102. Back channels such as back channel 114 may be provided with each dedicated channel (e.g., channel 110). The messages that are sent back through back channel 114 may include hardware status and/or changes to hardware or hardware configuration that are supported by the composition engine 112. Other examples of messages returned by the composition engine 112 include out of memory information, frame rate consumption information, hardware changes, etc.

Data packets may be arranged in batches, where batches of data packets are sent over the channel 108 to composition engine 112. For example, visual objects and resources of a visual tree 108 are sent over as a batch to composition engine 112. Composition engine 112 waits to receive the entire batch of visual objects and resources, before creating an analogous composition tree 116. In addition to the objects and resources that are sent in the graphics stream, commands or instructions are included the graphics stream. The commands or instructions are particularly used to create the composition tree 116. When system 100 includes multiple application programs, because each application program has its own dedicated channel in which graphics streams, and particularly batches of data packets, are communicated, composition engine 112 does not have to wait for other batches or graphics streams to be communicated over the channel. In other words, the dedicated channels prevent interference of communication of graphics streams (data packet batches) from different application programs. Furthermore, dedicated channels allow inherent synchronization of graphics streams such that data packets are received in their relative chronological order.

The composition tree 116 includes the same information (i.e., analogous objects and resources) as the visual tree 108; however, the composition tree 116 is formatted to be used by a process/function 118. The process/function 118 may be an operating system component or application program component that renders graphics or images using the composition tree 116. Process/function 118 may interpret or convert the composition tree 116 into lower-level graphics information such as individual pixel values or bitmaps which are used to render graphics on a display device (not shown). As further discussed below, objects and resources of composition tree 116, along with other commands or instructions as to reconstruct the composition tree 116 may be stored as a file in a local memory for future use or use in cases such as "refresh" when the graphics or image represented by the composition is lost.

Optimization and compression may be performed on the graphics streams as they are sent over the channel 110 or other channels. The optimization or compression may implement one of various optimization and/or compression methods. Furthermore, the graphic stream messages or graphics stream may be transported using one of various transport protocols (e.g., RPC, RDP, TCP/IP, etc.) and/or methods.

Figure 2:
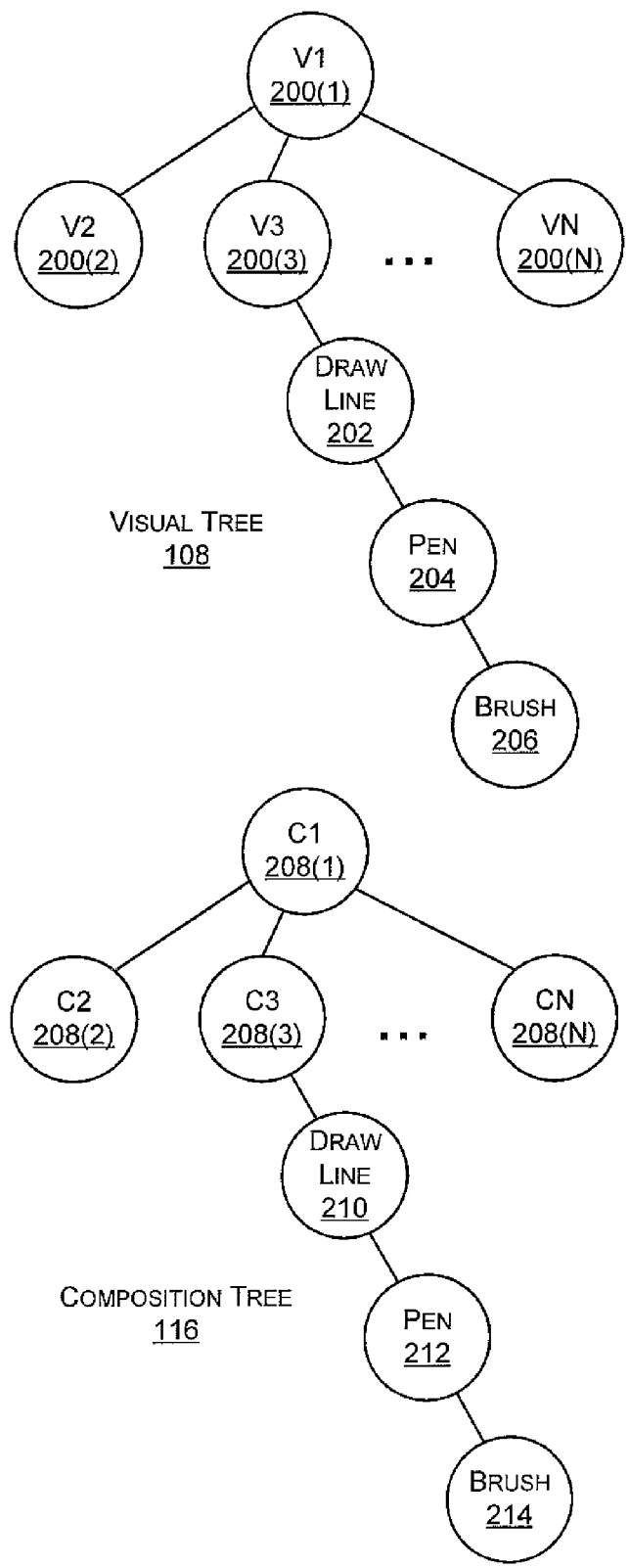
FIG. 2 is a diagram of a visual tree representing graphics or an image, and an analogous composition tree.

FIG. 2 shows an exemplary visual tree 108 and an exemplary composition tree 116. Visual tree 108 is made up of hierarchical graphic or visual objects V1 200(1) to VN 200(N). The visual tree 108 represents graphics or an image. Each of the visual objects 200 is further described by commands, instructions, or resources (collectively referred to as "resources"). In particular, resources are used to describe how to draw the visual objects. Resources may have higher order or lower order resources. For example, the graphics object V3 200(3) is defined by a "draw line" resource 202. The "draw line" resource 202 is further described by a "pen" resource 204. The "pen" resource 204 is further described by a "brush" resource 206.

As described above, the visual objects V 200 along with the resources (e.g., resources 202, 204, 206) are translated into data packets and sent in a graphics stream, along with commands or instructions. The commands or instructions are used to construct the composition tree 116 using analogous composition objects C1 208(1) to CN 208(N), and resources defining each of the composition objects C 208 (e.g., "draw line" resource 210, "pen" resource 212, and "brush" resource

214). As discussed above, a composition engine which receives the graphics stream of visual objects, resources, commands, and instructions may wait for all of the data packets to be received before constructing the composition. Therefore, the visual objects, resources, commands, and instructions may be sent as a batch.

Figure 3:
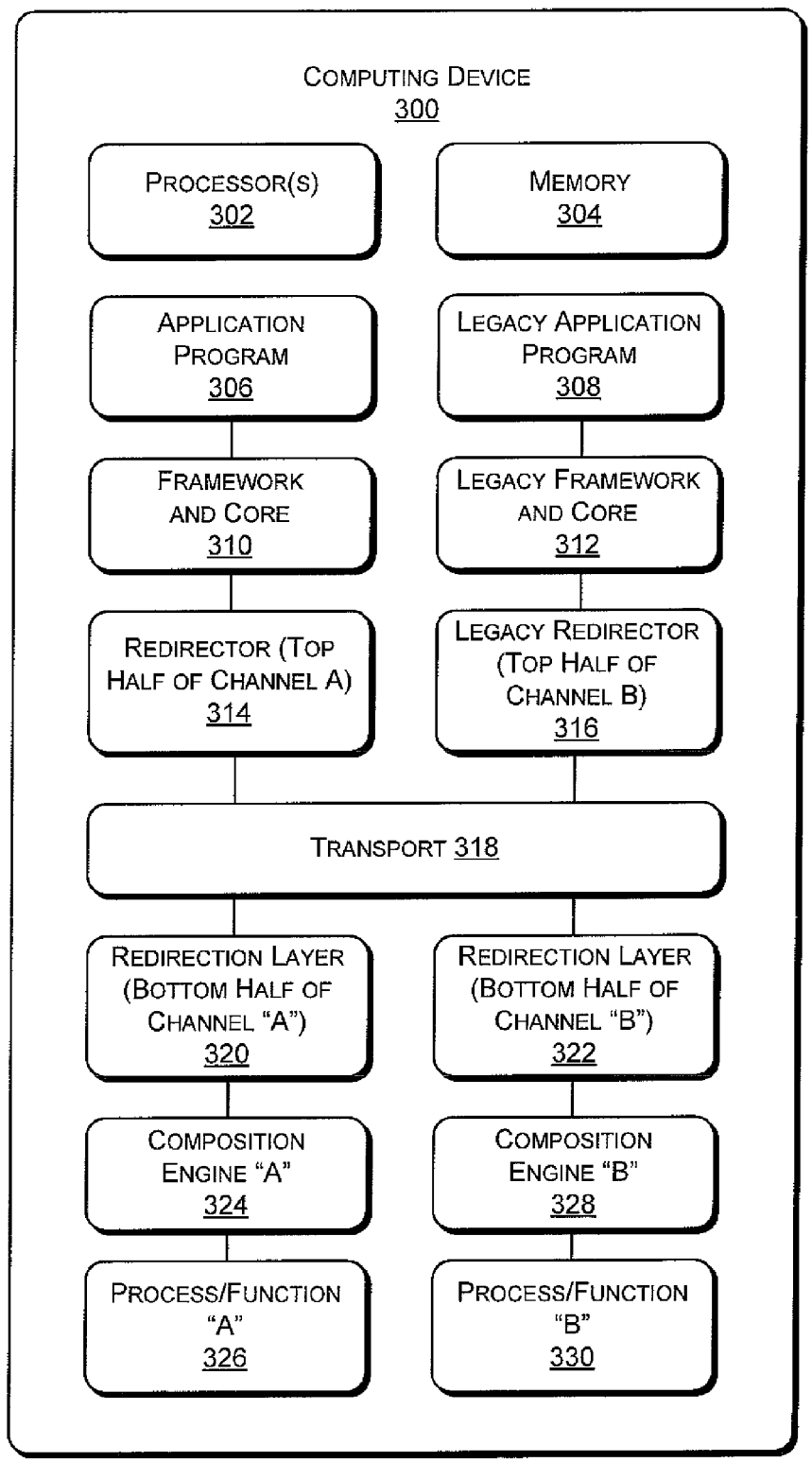
FIG. 3 is a block diagram of a computing device that implements a visual tree and composition trees to provide graphics or images.

FIG. 3 shows an exemplary computing device 300 which implements visual trees and composition trees to provide and render graphics or images. Computing device 300 is an implementation of a trans-process system; however, it will become evident, that elements in computing device 300 may also be implemented as part of, or have analogous elements in trans-machine and trans-thread systems. Computing device 300 may be a conventional desktop personal computer (PC), which includes a local operating system, processing unit or processor(s) 302, and a storage system or memory 304. As one example, the computing device 300 is a general-purpose PC implemented with a Windows® brand operating system from the Microsoft Corporation.

In this example, application program 306 and legacy application program 308 maybe part of multiple application programs resident in memory 304 or which reside separate from memory 304. Programs 306 and 308 are particularly accessed and controlled by processor(s) 302. The legacy application program 308 may include application programs that implement graphics command formats such as GDI.

Computing device 300 includes a framework and core 310 that supports application program 306. Framework and core 310 includes framework 104 and core 106 described above. In this example, legacy application program 308 is supported by a legacy framework and core 312. In other implementations, a single framework and core may be used to support multiple application programs. Framework and core 310 and legacy framework and core 312 are particularly configured to create and provide visual trees, such as visual tree 108, based on commands received from respective application program 306 and legacy application program 308.

Framework and core 310 is connected to a redirector 314 which may be an interface to a dedicated channel "A" that supports application program 306. Redirector 314 may be considered as a "top half" of the channel "A". Legacy framework and core 312 is likewise connected to a legacy redirector 316 which is an interface to a separate channel "B" that supports the legacy application program 308. Likewise, redirector 316 may be considered as a "top half" of the channel "B". Redirectors 314 and 316 may be connected to or use a transport layer or transport 318. A redirection layer 320 is a bottom half of channel "A", and a redirection layer 322 is a bottom half of channel "B".

A composition engine "A" 324 receives a graphics stream through channel "A" and creates a composition tree for use by process/function "A" 326. Likewise, composition engine "B" 328 receives a graphics stream through channel "B" and creates a composition tree for use by process/function "B" 330. Each of process/function "A" 326 and process/function "B" 330 uses the created composition trees to render or generate graphics or images to a local display or output device.

Figure 4:
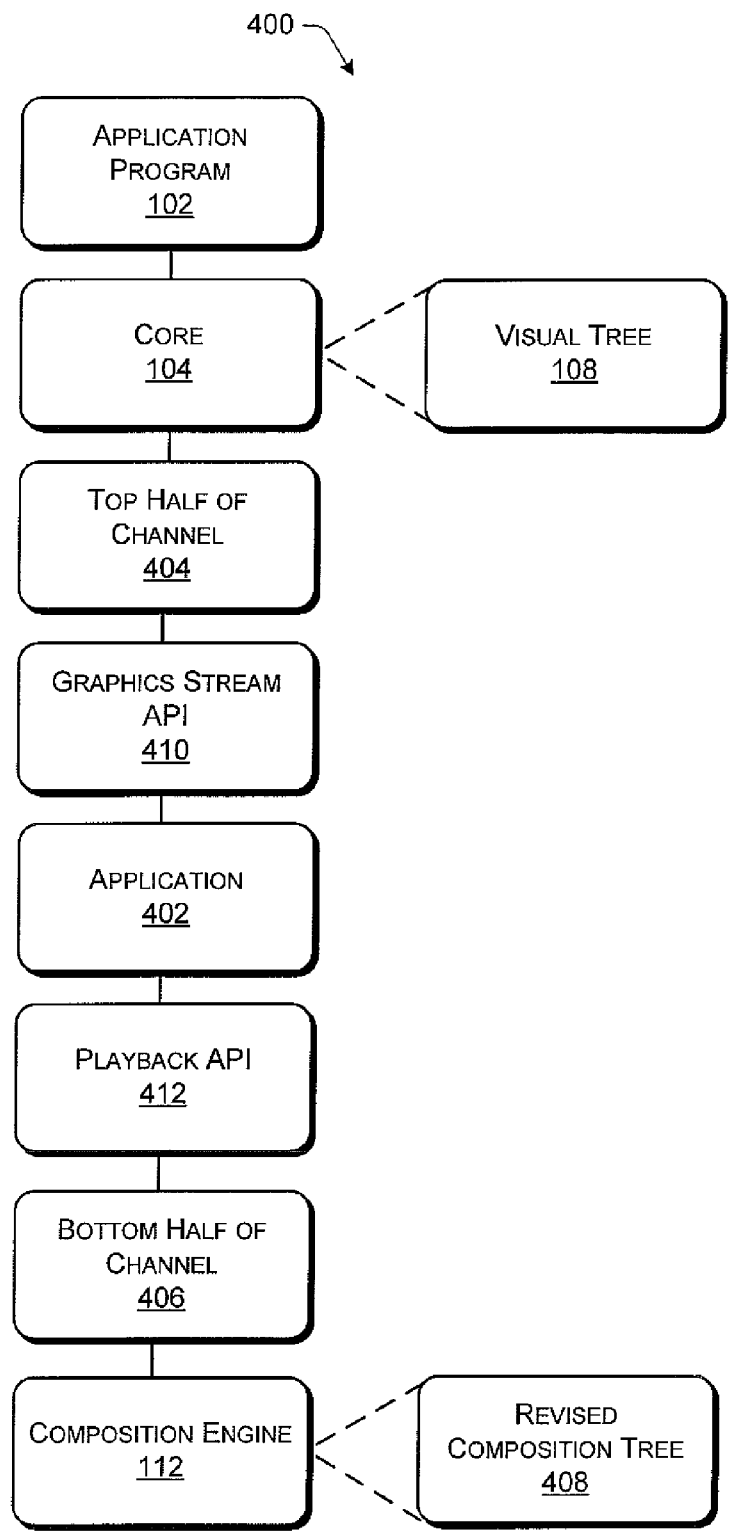
FIG. 4 is a block diagram of a system that implements an application and application program interfaces that modify a composition tree of graphics or an image.

FIG. 4 shows a system 400 that implements an application and application program interfaces used to modify a composition tree of graphics or an image. In this example, system 400 is a modification of system 100 described above. In certain cases, it is desirable to modify graphics or images that are provided by application programs, such as application program 306 and legacy application program 308. Considering that optimization or compression may take place when graphic stream messages or graphics streams are sent, and particularly in trans-machine systems, it is desirable to minimize degradation of the graphics or image when modification takes place.

In this example, an application 402 is located between a top half of channel 404 and a bottom half of channel 406. The application 402 may perform a graphics or image modification, or in certain cases application 402 may be configured as an accessibility application that is able to access or look at a graphics stream that is being passed through the channel (i.e., between the channel halves 404 and 406). In general, application 402 is considered as an intermediary that may be placed within a channel.

An example of graphics or image modification is enlarging or magnifying the graphics or image. The application 402 particularly modifies the graphics stream or particular data packets passing through the channel, such that a revised composition tree 408 is created. As further discussed below, the modification may be made on a particular node or nodes of the composition tree, regardless of the hierarchy of the node or nodes in the composition. If a relatively higher-level node is modified, all the nodes below it on the composition tree are affected (i.e., modified).

A graphics stream application program interface (API) 410 and playback API 412 may also be provided and exposes the application 402 to the core 104 and composition engine 110. In particular, graphics stream API 410 is used to access a graphics stream from the core 104 and playback API 412 is used by composition engine 110 to open the graphics stream from application 402.

Graphics stream API 410 may include a "graphics stream open" API which opens the graphics stream for reading. Furthermore, a pointer may be implemented and provided to application 402 by the "graphics stream open" API to the particular function or process which composition engine 110 supports. Graphics stream API 410 may further include a "graphics stream close" API which closes the graphics stream for reading. The "graphics stream close" API causes a close message to be sent to composition engine 110 or to the particular function or process which composition engine 110 supports.

Graphics stream API 410 may also include a "graphics stream set transform hint" API that provides a hint or message to the core 104, or in the case of trans-machine system (e.g., terminal-service system) a graphics server (i.e., core 104 resident in the graphics server), that the application 402 intends to perform an action or modification (e.g., magnification) to the graphics stream. For example, in the case of magnification, the "graphics stream transform hint" API provides a message back to application program 102 to account for enlargement or magnification. Furthermore, a pointer may be provided as to the particular revised composition tree 404. The message maybe sent through a back channel, such as back channel 114.

Playback API 412 provides the ability for composition engine 112 to draw or create the revised composition tree 408. In general the playback API 412 exposes the bottom half of channel 406 and the composition engine 112 to the application 402.

Figure 5:
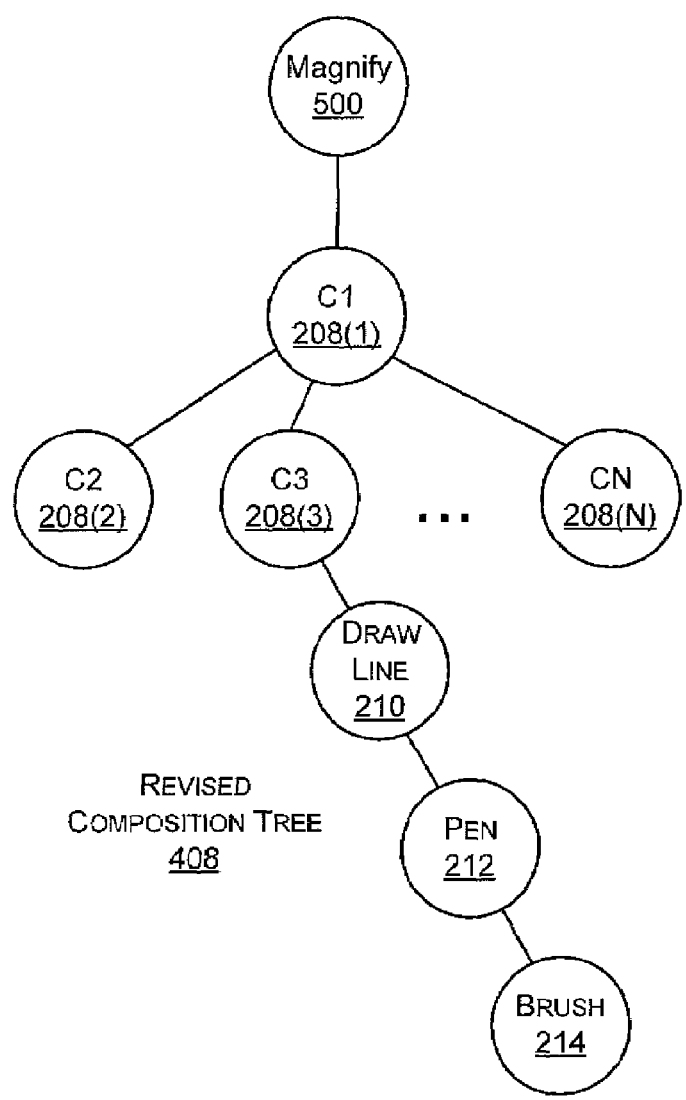
FIG. 5 is a diagram of a revised composition tree.

FIG. 5 is a diagram of a modified or revised composition tree. In particular, the revised composition tree 408 as modified by application 402 is illustrated. In this example, the modification is to enlarge or magnify a prior composition tree (e.g., composition tree 116).

When a modification takes place as to graphics or images, the modification is performed on the composition tree, and particularly to a node or nodes of the composition tree. Depending on which node or nodes or modified, other nodes may be affected. In other words, if a particular node is modified, all lower-level nodes of branches from that particular node are affected or modified. In this example, the node C1 208(1) is modified by a "magnify" node 500. Therefore, the prior composition tree 116 is modified (i.e., magnified) and is provided as revised composition tree 408.

Figure 6:
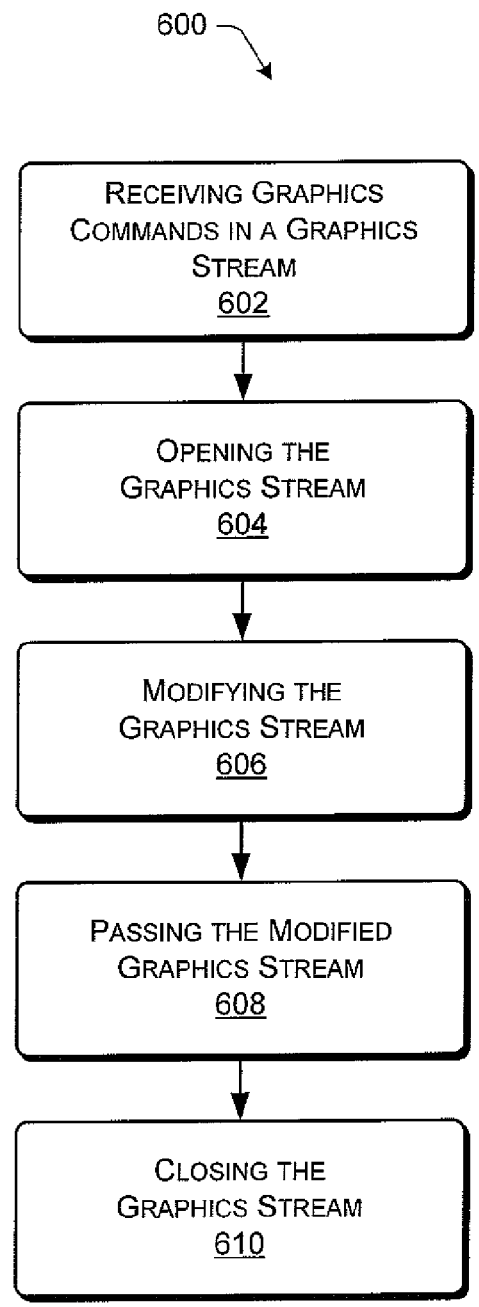
FIG. 6 is a flowchart illustrating a process.

FIG. 6 shows a process 600 that provides for graphics streams representative of visual trees to a process or function. Process 600 may further be implemented as an API that supports modification of the graphics stream. The process 600 is illustrated as a collection of blocks in a logical flow graph, which represent a sequence of operations that can be implemented in hardware, software, firmware, or a combination thereof. In the context of software, the blocks represent computer instructions that, when executed by one or more processors, perform the recited operations. Although described as a flowchart, it is contemplated that certain blocks may take place concurrently or in a different order. The process 600 may be implemented, for example, by the system 100 of FIG. 1 and/or computing device 300 as discussed in FIG. 3, although the process 600 may be implemented by other architectures.

At block 602, graphics commands are sent to and received by an application that is located in a channel. The application may be an accessibility application or an application that performs a modification. An example of such an application is application 402. The graphics stream may include data packets which are representative of visual objects and resources that make up a visual tree.

At block 604, the application opens or accesses the graphics stream. The opening may be related to merely reading the graphics streams and data packets of the graphics stream, or a modification may be performed on the graphics stream. Furthermore, a pointer may be provided to a function or processes supported by a composition engine receiving the graphics stream.

At block 606, the actual modification of the graphics stream and/or data packets is performed. Examples of modification include magnification. In certain cases, a message may be provided to a core that provides the graphics streams, where the message indicates that modification such as magnification is to take place.

At block 608, the modified stream is passed on to the composition engine which may create an composition tree based on the original visual tree, and changes or modifications from the modification.

At block 610, the graphics stream may be closed. In other words, the application is precluded from reading the graphics stream. A message may be sent to the composition engine indicating that the closing is occurring or has occurred.

Figure 7:
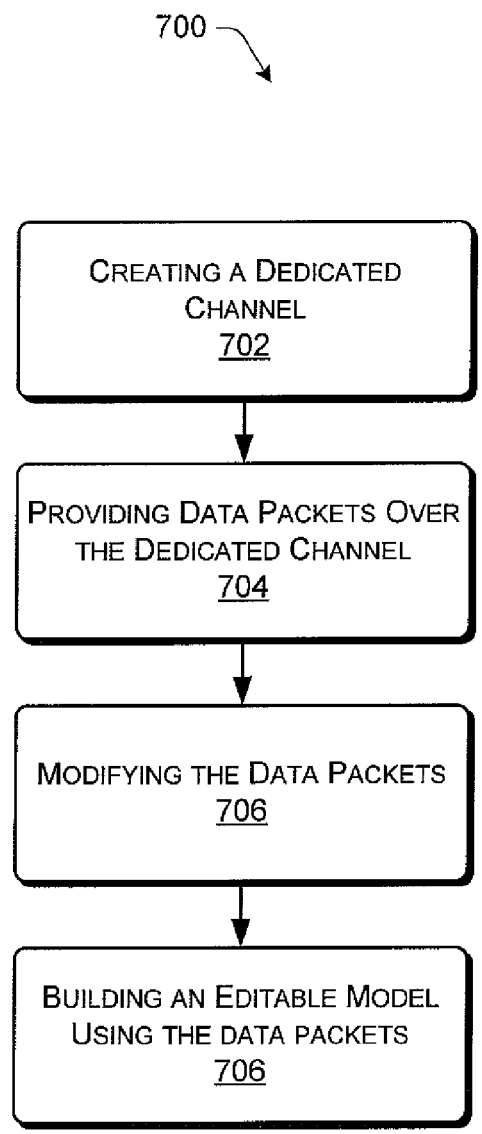
FIG. 7 is a flowchart illustrating a process.

FIG. 7 shows a process 700 that allows for communication between a framework and composition engine. Process 700 may further be implemented as a protocol to provide such communication. The process 700 is illustrated as a collection of blocks in a logical flow graph, which represent a sequence of operations that can be implemented in hardware, software, firmware, or a combination thereof. In the context of software, the blocks represent computer instructions that, when executed by one or more processors, perform the recited operations. Although described as a flowchart, it is contemplated that certain blocks may take place concurrently or in a different order. The process 700 may be implemented, for example, by the system 100 of FIG. 1 and/or computing device 300 as discussed in FIG. 3, although the process 600 may be implemented by other architectures.

At block 702, a dedicated channel is created which allows communication between the framework or a core, and the composition engine. A dedicated back channel may also be created to allow the composition engine to send back messages to the framework or core.

At block 704, data packets are sent over or provided over the dedicated channel. The data packets may be part of a graphics stream and sent as a batch. The batch of data packets includes all objects and resources that are necessary to create an editable model. The model is representative of graphics or an image, and for example, may be a hierarchical tree such as visual tree 108 described above.

At block 706, an application may be introduced in the channel to modify the graphics stream or data packets. Examples of the application include a graphics stream reader or a magnifier. A message may be returned to the framework or core, indicating that a modification is to be performed.

At block 708, the editable model is built using the unmodified or modified data packets. As discussed, the editable model may be analogous hierarchical tree to the visual tree created at the core. In particular, the editable model is considered or referred to as a composition tree, such as composition trees 116 and 408.

CONCLUSION

The above described system supports communicating a editable model such as visual tree to a composition engine that creates a composition tree used to render graphics or an image. Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method of modifying graphics commands representative of a visual tree comprising:

receiving a message specifying a dedicated channel connection for receiving a graphics stream, wherein the message indicates identifying fields of the dedicated channel in a format including a Connection ID, followed by a Channel ID, followed by a Command ID, followed by a Command Data;

receiving a graphics stream from a first application program, the graphics stream including data packets, commands and instructions, the data packets comprising visual objects and resources that make up the visual tree, wherein the resources describe how to draw the visual objects;

opening the graphics stream with a second application program, wherein the graphics stream received from the first application being located in a dedicated channel;

modifying commands and instructions of the graphics stream passing through the dedicated channel with the second application program to create a modified graphics stream; and passing the modified graphics stream to a composition engine implemented by a processor of a computing device, wherein the composition engine creates a modified composition tree based on the visual tree and the commands and instructions of the modified graphics stream, wherein the modified commands and instructions of the graphics stream when implemented by the composition engine modify at least one node of the modified composition tree, wherein a node of a lower level of hierarchy is automatically modified if a node of a higher level of hierarchy is modified, wherein commands and instructions describe how to draw the modified composition tree based on composition objects and resources, wherein the composition objects are analogous to the visual objects, wherein the modified composition tree includes higher-level graphics information analogous to the visual tree.

2. The method of claim 1 wherein the opening includes implementing and providing a pointer for an application supported by the composition engine.

3. The method of claim 1 wherein the modifying comprises a magnification operation on the graphics stream.

4. The method of claim 1 further comprising closing the graphics stream from being read by an application.

5. The method of claim 4 wherein the closing further comprises sending a message to the composition engine that the closing is occurring.

6. The method of claim 1 further comprising providing a message to a core as to modifications made to the graphics stream.

7. A system comprising:

a framework that accesses graphics commands and instructions representing graphics and images from a first application program;

a core which receives the graphics commands and instructions from the framework, and creates a visual tree, the visual tree comprising visual objects and resources;

a dedicated channel that communicates data packets representative of the visual tree from the core, wherein a plurality of data packets are combined to form a batch of data packets, wherein the batch of data packets include all visual objects and resources necessary for creating an editable model of the visual tree, wherein the dedicated channel is configured to prevent interference from communication of batches of data packets from applications not associated with the dedicated channel;

a second application program residing in the channel, the second application program modifying the data packets being communicated through the channel and generating a revised composition tree, wherein the modifying is made to at least one node of the composition tree, wherein a node of a lower level of hierarchy is automatically modified if a node of a higher level of hierarchy is modified;

a composition engine connected to the core, the framework, the first application program, and second application program via the dedicated channel, wherein the composition engine is configured to create a composition tree analogous to the visual tree, wherein the composition tree does not create the composition tree until the composition engine has receive at least one batch of data packets, wherein the composition tree is configured based on the commands and instructions; and a dedicated back channel for communicating messages from the composition engine back to the core, framework and the first and second application programs, wherein the messages indicate hardware status, hardware changes, hardware configuration changes, memory capacity information, and frame rate consumption information.

8. The system of claim 7 wherein the core creates the visual tree by creating hierarchical visual objects and hierarchal resources, wherein the resources describe how to render the visual objects.

9. The system of claim 7 wherein the channel is comprised of a top half and a bottom half, wherein an application may be implemented between the top half and the bottom half.

10. The system of claim 7 wherein the system is one of the following: a trans-machine system, a trans-process system, or a trans-thread system.

* * * * *